United States Patent [19]
Dorner et al.

[11] Patent Number: 5,781,585
[45] Date of Patent: Jul. 14, 1998

[54] ARRANGEMENT FOR MONITORING A TWO-WIRE BUS LINE

[75] Inventors: Jürgen Dorner, Wendlingen; Bernhard Rall, Ulm; Roland Haun, Korb, all of Germany

[73] Assignee: Daimler Benz Aktiengesellschaft, Stuttgart, Germany

[21] Appl. No.: 419,925

[22] Filed: Apr. 11, 1995

[30] Foreign Application Priority Data

Apr. 11, 1994 [DE] Germany .................... 44 12 362.0

[51] Int. Cl.$^6$ .................... H03B 3/46; H03B 17/00; H04Q 1/20
[52] U.S. Cl. .................... 375/224; 327/64; 375/257
[58] Field of Search .................... 375/224, 225, 375/226, 227, 257, 317, 318, 371; 371/20.1; 370/242, 248; 327/63, 64, 68, 69

[56] References Cited

U.S. PATENT DOCUMENTS 5,267,251  11/1993  Lenoir et al. .
5,375,142  12/1994  Pitot et al. .................... 375/224

FOREIGN PATENT DOCUMENTS 0 427 638  5/1991  European Pat. Off. .
0 489 990  6/1992  European Pat. Off. .
2276066    9/1994  United Kingdom .
WO90/09713 8/1990  WIPO .
WO92/17017 10/1992 WIPO .
WO93/02517 2/1993  WIPO .
WO93/23940 11/1993 WIPO .

*Primary Examiner*—Tesfaldet Bocure
*Assistant Examiner*—Bryan Webster
*Attorney, Agent, or Firm*—Spencer & Frank

[57] ABSTRACT

An arrangement for monitoring a two-wire bus line for serial transmission of digital data includes a bus subscriber receiving circuit coupled to the two-wire line and including three comparators each having two inputs and an output for producing a logical output signal in dependence of signals at the two inputs. A signal line voltage on each wire of the two-wire bus line is applied, respectively, to the two inputs of a first one of the comparators and one of the two signal line voltages, an auxiliary voltage is applied, respectively, to the two inputs of a second one of the comparators and the other of the two signal line voltages and an auxiliary voltage being applied, respectively, to the two inputs of a third one of the comparators. A logic circuit is coupled to the outputs of the three comparators for simultaneously receiving the logical output signals of at least the second and third comparators and for signaling a fault-free condition of the bus system if all received logical output signals from the comparators are in agreement, and for signaling a fault if all received logical output signals from the comparators are not in agreement.

6 Claims, 3 Drawing Sheets

ARRANGEMENT FOR MONITORING A TWO-WIRE BUS LINE

CROSS REFERENCE TO RELATED APPLICATIONS

The present application claims the right of priority with respect to application No. DE P 44 12 362 filed in Germany on Apr. 11, 1994, the disclosure of which is incorporated herein by reference.

BACKGROUND OF THE INVENTION

The invention relates to an arrangement for monitoring a two-wire bus system for serial transmission of digital data by switching over voltages on the two signal lines of the bus line. Such an arrangement includes a receiving circuit of a bus subscriber having at least three comparators, with the voltages of the two signal lines being applied to the inputs of the first comparator and, respectively, one of the two signal line voltages and one auxiliary voltage each being applied to the inputs of the second and the third comparator.

Such an arrangement for a CAN bus system in a vehicle, for example, for generating a wake-up signal, is known from PCT International Publication WO 90/09713. Apart from a receiving comparator whose inputs are connected in an undisturbed operating condition to the two signal lines of the two-wire bus line, two further comparators are provided in an error detection circuit, with the inputs of the comparators in the undisturbed case being connected respectively to one of the two signal lines and to one of two auxiliary voltages. Together with an OR gate, the two further comparators are component parts of an error detection circuit. If a line fault occurs, a mean voltage can be applied instead of one of the two signal lines to one of the inputs of each of the three comparators. In this manner it is be possible to sustain a single-wire operation.

SUMMARY OF THE INVENTION

It is an object of the present invention to provide an arrangement for monitoring two-wire bus lines which can be fabricated at a low expenditure, particularly by means of integrated circuits, and which can be applied in a reliable and flexible manner.

The above and other objects are accomplished according to the invention by the provision of an arrangement for monitoring a two-wire bus line for serial transmission of digital data, comprising: a bus subscriber receiving circuit coupled to the two-wire line and including three comparators each having two inputs and an output for producing a logical output signal in dependence of signals at the two inputs, with a signal line voltage on each wire of the two-wire bus line being applied, respectively, to the two inputs of a first one of the comparators, one of the two signal line voltages and an auxiliary voltage being applied, respectively, to the two inputs of a second one of the comparators, and the other of the two signal line voltages and an auxiliary voltage being applied, respectively, to the two inputs of a third one of the comparators; and a logic circuit coupled to the outputs of the three comparators for simultaneously receiving the logical output signals of at least the second and the third comparators and for signaling a fault-free condition of the bus system if all received logical output signals from the comparators are in agreement, and for signaling a fault if all received logical output signals from the comparators are not in agreement.

The arrangement according to the invention signals the occurrence of interferences without delay, and leaves the response to such interferences to downstream evaluation devices. The arrangement according to the invention can therefore be assembled in a simple manner and can be used in systems with system controls of any type when interferences occur. It is particularly advantageous that the comparators used for detecting interferences can at the same time also be used as receiving comparators for different interference conditions, whose outputs can be connected to subsequent receiving circuits via a demultiplexer, depending on the type of interference that has been identified. The logic circuit that is used can be configured advantageously according to integrated injection logic ($I^2L$) technology as is well known to those skilled in the art. The comparator inputs are continuously acted upon by the bus voltages, i.e. also in case of an interference, so that additional switching means in the important signal paths are not necessary. Moreover, the disappearance of an interference that is only temporary or the continuation of an interference can potentially be detected by the logic in the single-wire operation as well. By means of a simple, minor voltage offset at one input, the first comparator can also signal a short-circuit between the bus lines and, advantageously, it can also be fed with its output to the logic circuit, which then only signals an error-free operation, if all comparator output signals are in agreement, otherwise it signals an interference.

DETAILED DESCRIPTION OF THE PREFERRED EMBODIMENTS

Figure 1:
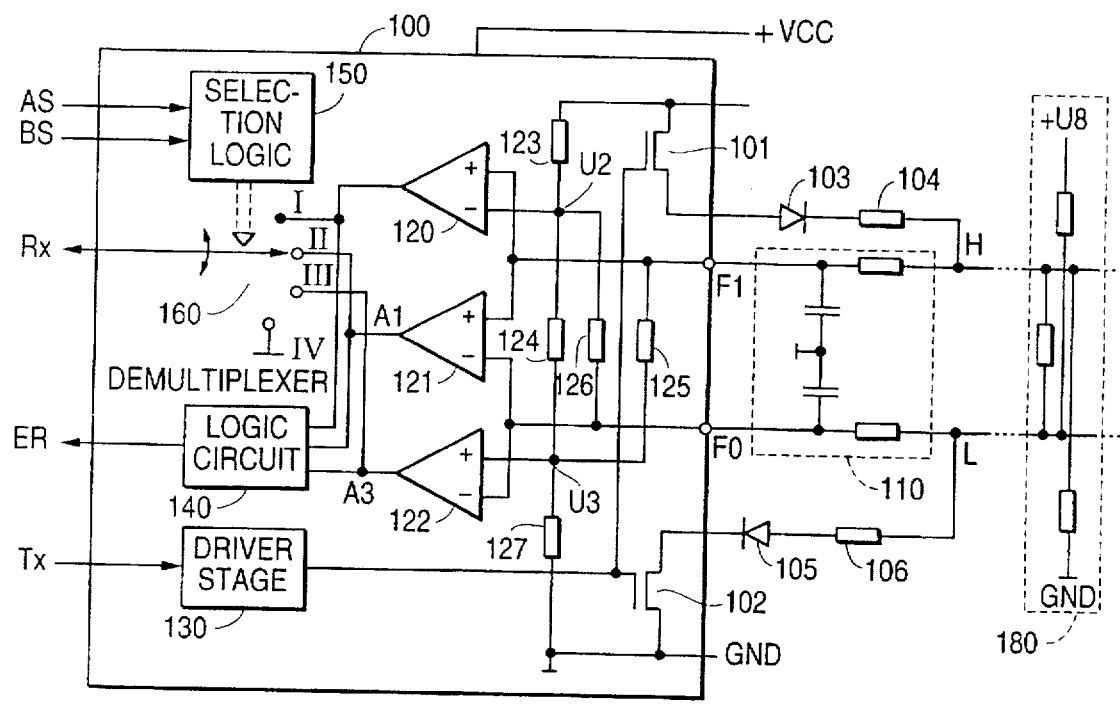
FIG. 1 is circuit schematic and partial block diagram of an integrated CAN bus driver incorporating the arrangement of the invention.

Referring to FIG. 1, there is shown a bus driver 100 which is based on a CAN (Controller Area Network) bus system, in which a recessive bit condition is equal to a condition without an active transmitting bus subscriber and the voltages of a bus line comprising two signal lines H and L are fixed preferably by means of a passive resistance network 180, connected to the bus lines H,L and to a reference potential GND and a supply voltage +UB. The resistance network is common to all subscribers and may be located anywhere in the network. In the case of transmission, a dominant bit condition of the bus line is impressed on signal lines H and L in a known fashion according to a transmitting control signal $T_x$ and a driver stage 130 via switching transistors 101 and 102. In addition, diodes 103, 105 and series resistors 104, 106 are also inserted in a known manner into the supply lines of the transistors to the signal lines. By switching transistors 101, 102 into a conducting state, an additional driver current via elements 101, 103, 104 and 102, 105, 106, respectively, results in a negative-sequence shift of the signal voltages of signal lines H and L.

The signal lines H and L are applied to high-resistive receiving inputs F1 or F0 of bus driver 100 via an RC filter arrangement 110. An operating voltage +VCC of bus driver 100 with respect to a reference potential GND is assumed to be, for example, 5V. A supply voltage +UB with respect to GND is applied for deriving the auxiliary voltages and the signal voltages U1 and U0 of signal lines H and L. If the supply voltage +UB is chosen to be equal to the operating voltage, for example, 5V, then the signal voltages U1 and U0 of signal lines H and L at inputs F1 or F0 of bus driver 100 are assumed to be $U1_R=2$ V and $U0_R=3$ V for a recessive bit R and $U1_D=3$ V and $U0_D=2$ V for a dominant bit D.

A resistance divider chain having resistors 123, 124 and 127 between +UB and GND generates two auxiliary voltages U2 and U3, which preferably lie symmetrically to a mean voltage value +UB/2 and are only slightly shifted with respect to the mean voltage, e.g., by 50 mV, so that U2=2.55V and U3=2.45 V in this example.

In order to still have reserves at high common-mode interferences and mass potential differences, the voltages of signal lines H and L can be restricted to the environment of UB/2 via RC filter arrangement 110 and resistors 125, 126. Due to monolithic integration, the comparators are extremely precise with offset voltages of, for example, a maximum of +5 mV, so that the voltage jumps at F1 and F0 can, for example, be limited to one fifth of those at signal lines H and L without putting a correct signal detection at risk.

The preferred embodiment of the of bus driver 100 as shown within the solid line rectangle comprises three comparators 120, 121 and 122 for monitoring the bus line with respect to the occurrence of an interference The first comparator 121 has its non-inverting input (+) coupled to signal line H via receiving input F1 and RC filter arrangement 110 and, analogously, has its inverting input (−) coupled to signal line L via receiving input F0 and RC filter arrangement 110. The second comparator 120 is has its non-inverting input (+) coupled to signal line H and its inverting input (−) to the first auxiliary voltage U2. The third comparator has its inverting input (−) coupled to signal line L and its non-inverting input (+) coupled to the second auxiliary voltage U3. In the following, the signals at the comparator outputs are identified as logic conditions "0" and "1" without considering the concrete voltage value, depending on the polarity of the differential voltage between inverting and non-inverting input of the respective comparator.

The outputs A1, A2, A3 of comparators 121, 120 and 122, respectively, are connected to inputs of a logic circuit 140, which emits a logical interference condition signal ER as an output signal. By way of example, it is assumed that ER=0 for an undisturbed condition and ER=1 when an interference condition is detected.

As explained in greater detail below by consideration of different interference conditions with reference to the following Table, the illustrated embodiment of the comparator wiring is selected advantageously so that the individual output signals not only allow information regarding an interference condition, but at the same time can be used as receive signals in an undisturbed operation or in the single-wire operation. For the selection of the output signal that is respectively suited as receive signal Rx as a function of the detected interference condition, a demultiplexer 160 is provided which is controlled by an evalution device (not shown) via a 2 bit control signal (AS, BS) while possibly inserting a selection logic 150. For interference conditions which no longer allow data reception that can be evaluated, a constant potential GND can be applied to the receive signal output Rx via the multiplexer. Logic circuit 140 only signals the detection of any interference condition without evaluating this condition. The evaluation of the interference takes place in a downstream evaluation device (not shown).

Preferably, logic circuit 140 is configured so that it interconnects the three comparator output signals to form an interference condition signal ER such that ER=0 for A1=A2=A3=0 and for A1=A2=A3=1, and ER=1 in all other cases. This allows a particularly simple implementation in $I^2L$ engineering, for example, by using standard $I^2L$ gates with a base and three collectors which act as a wired OR circuit on the base of a downstream transistor. The person skilled in the art is generally familiar with the details regarding the possibilities for implementing the circuit from the comprehensive field of $I^2L$ engineering. Other techniques in integrated circuit technology are also applicable in the design of the logic circuit 140.

Figure 2:
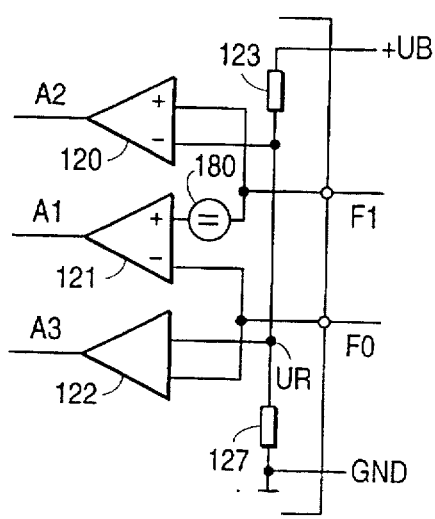
FIG. 2 is a circuit schematic showing the input wiring of the comparators according to a further embodiment of the invention.

Changing the specific example outlined in FIG. 1 and FIG. 2 by way of changing the polarities at inputs and/or outputs and, tied to this, an adjusted logical interconnection in the logic circuit 140 is within the normal capacities of a person skilled in the art.

TABLE

| Operation | | L | H | A2 | A1 | A3 | ER | M | Rx |
|---|---|---|---|---|---|---|---|---|---|
| a) undisturbed | R | 2V | 3V | 0 | 0 | 0 | 0 | II | 0 |
| | D | 3V | 2V | 1 | 1 | 1 | 0 | II | 1 |
| b) L to GND −> | R | 2V | 0V | 0 | 1 | 1 | 1 | I | 0 |
| single-wire H | D | 3V | 0V | 1 | 1 | 1 | 0 | I | 1 |
| c) L to + UB −> | R | 2V | +UB | 0 | 0 | 0 | 0 | I | 0 |
| single-wire H | D | 3V | +UB | 1 | 0 | 0 | 1 | I | 1 |
| d) H to GND −> | R | 0V | 3V | 0 | 0 | 0 | 0 | III | 0 |
| single-wire L | D | 0V | 2V | 0 | 0 | 1 | 1 | III | 1 |
| e) H to + UB −> | R | +UB | 3V | 1 | 1 | 0 | 1 | III | 0 |
| single-wire L | D | +UB | 2V | 1 | 1 | 1 | 0 | III | 1 |
| f) L open −> | R | 2V | U0 | 0 | 0 | 0 | 0 | I | 0 |
| single-wire H | D | 3V | U0 | 1 | 1 | 0 | 1 | I | 1 |
| g) H open −> | R | U1 | 3V | 0 | 0 | 0 | 0 | III | 0 |
| single-wire L | D | U1 | 2V | 0 | 1 | 1 | 1 | III | 1 |
| h) H, L to + UB no reception | R,D | +UB | +UB | 1 | ? | 0 | 1 | IV | 0 |
| i) H, L to GND no reception | R,D | 0V | 0V | 0 | ? | 1 | 1 | IV | 0 |

The above Table lists the different operating conditions, the voltages at signal lines L and H occurring under these conditions and the logical levels of the signals A1, A2, A3, ER as well as the suitable position M of the multiplexer 160 and the signal Rx resulting therefrom, respectively for the recessive (R) and dominant (D) line bit The appearance of ? in the Table indicates a non-defined condition.

In the undisturbed condition a), the differential signal between signal lines H and L contains the valid information which can be evaluated by comparator 121 with a large signal-to-noise ratio. The comparators 120 and 122, which are only connected with one input to respectively one of the two signal lines H or L and with the other input to one of the auxiliary voltages in the proximity of the mean voltage +UB/2, can also supply a correct receive signal with a small signal-to-noise ratio. This is utilized in a manner known per se for the single-wire operation, in which information from a disturbed signal line is deliberately omitted.

The voltage difference between the auxiliary voltages U2 and U3 is not compelling but it ensures that, in the no-load operation, a dominant receive signal is not released to Rx.

The Table shows that the value of the interference condition signal is also dependent on the respective message bit value D or R. ER=1 occurs if at least one of the comparator output signals is incorrect. The selection of the response to an interference signaled via ER can be implemented in downstream evaluation devices. For example, the occurrence of an interference signal in a majority of bit clock steps can be waited for until a single-wire operation or resting of the reception is selected by way of a switch-over of the demultiplexer. Measures known from the prior art can be employed for the selection of an alternative operating condition.

The interference condition signal ER is independent of the switch position of the demultiplexer and is available continuously so that not only an interference but also the disappearance of an interference from the ER signal can be detected quickly.

In the embodiment shown in FIG. 2, in which identical reference numerals are used to identify the same parts of the arrangement as in FIG. 1, only one auxiliary voltage UR is provided, which, preferably, is equal to UB/2. It is made available at the center tap of a voltage divider which is formed by the same resistors 123, 127 as in FIG. 1. In the embodiment of FIG. 2, an input, for example, the non-inverting input of first comparator 121, is acted upon by a voltage offset illustrated by a voltage source 180. The amount of the offset voltage is small compared to the signal deviation on the bus lines between recessive and dominant bit condition and, for example, amounts to 20 mV. Preferably, the sign of the offset voltage is such that a recessive bit condition is signaled at the output of fist comparator 121 in case of a short circuit of signal lines H and L to each other, thus presenting identical signal voltages at F1 and F0. The implementation of the voltage offset depends on the configuration of the comparator in detail and preferably takes place so as to be insulated with respect to the bus line, e.g., by insertion between two stages of a two-stage input amplifier.

In the above examples, the description of the invention is based on the assumption that the operating voltage of the driver stage is stabilized to a constant value and that the bus voltages and the auxiliary voltages are derived from the stabilized voltage.

On the other hand, in another advantageous embodiment of the invention, it is provided that the bus voltages and the auxiliary voltage are derived from an non-stabilized voltage, in particular, the battery voltage of a vehicle. Bus voltages and auxiliary voltages are then, as can be seen from the embodiment shown in FIG. 1, dependent on and floating with variations in the actual value of the battery voltage. But fixed relationships between bus voltages and auxiliary voltages remain in effect. It applies that, in particular, in the undisturbed condition, the bus voltages that can be tapped at F1, F0 essentially behave symmetrically to the auxiliary voltage UR of the mean voltage of U2 and U3. In addition, further resistance networks may be provided for the reduction of voltages, in particular, at higher bus voltages and a low stabilized voltage for the electronic components such as comparators, logic circuit, etc.

Figure 3A:
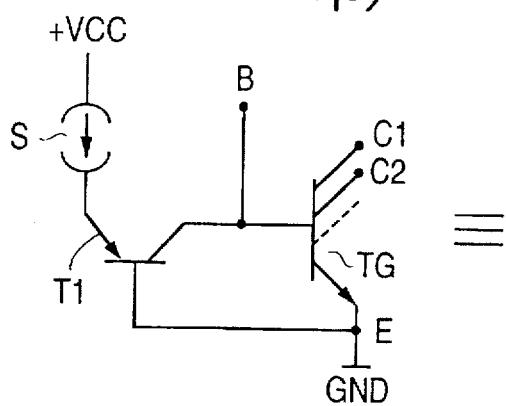
FIG. 3(a)–3(b) are a circuit schematic of an $I^2L$-gate with its equivalent symbol.
Figure 3B:
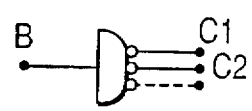

The I²L gate shown in FIG. 3 (a) together with its equivalent symbol in FIG. 3(b) works as an inverter stage with multiple output contacts. It comprises a current source S for providing an injection current, an injection transistor TI and a gate transistor TG with a base contact B, an emitter contact E and several separate collector contacts C1, C2, . . . , whereby the base contact is the input contact and the collector contacts are the output contacts. With an input signal at low potential applied to the base contact the gate transistor is in a non conducting state. Turning off the low potential input signal results in turning on the gate transistor and the potential of the output contacts going low. The I²L inverter gate including its use in a logic circuit is well known in the art.

Figure 4:
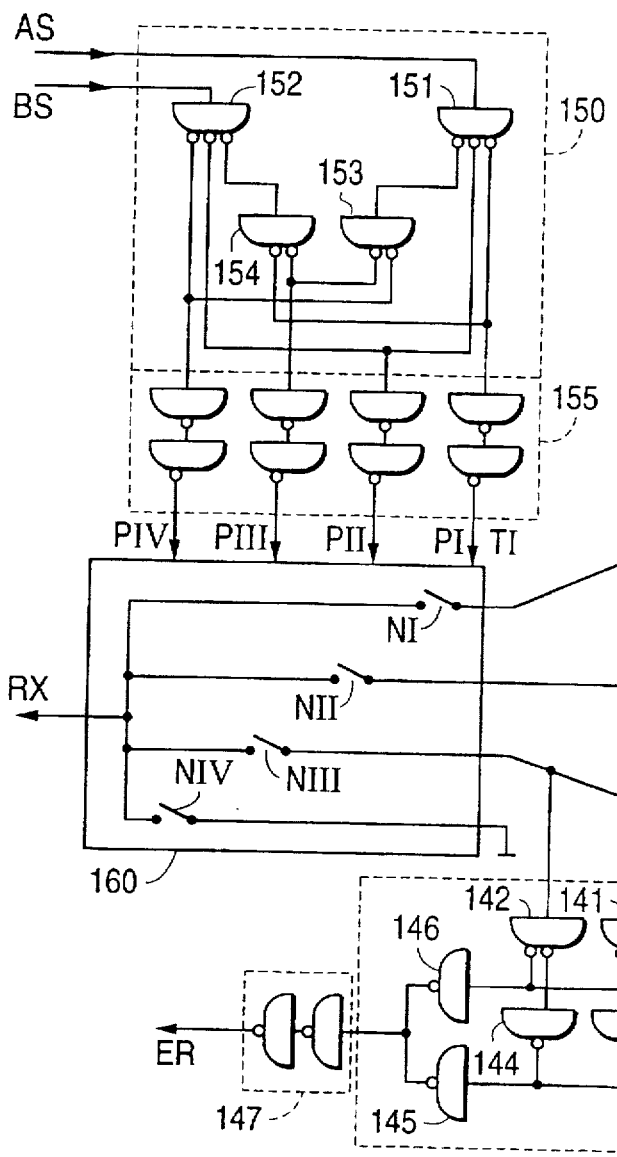
FIG. 4 is a circuit schematic showing details of the logic circuit and the selection logic.

In the embodiment as shown in FIG. 4, I²L gates with one, two or three separate collector contacts may be employed. In the selection logic 150 activating signals PI, PII, PIII, PIV for electronic switches NI, NII, NIII, NIV of demultiplexer 160, respectively, are derived from the 2 bit control signal (AS, BS) by way of gates 151, 152 having three output contacts each and gates 153, 154 having two output contacts each. The inputs of gate 151 and gate 152 are fed by the control signal. A first output contact of gate 151 is connected to the input contact of gate 153. A first output of gate 152 is fed to the input of gate 154. The output contacts of the different gates are combined in pairs to provide the activating signals. A combination of second output contacts of gates 151 and 152 provides activating signal PII only if the gate transistors of both gates 151 and 152 are in a non-conducting state. In an equivalent manner, a combination of first output contacts of gates 153 and 154 provides activating signal PIIIa, combination of third output contact of gate 151 and second output contact of gate 154 provides activating signal PI and a combination of third output contact of gate 152 and second output contact of gate 153 provides activating signal PIV. Additional gates may be inserted in the paths of the activating signals as buffers or converters 155. Only one of the electronic switches NI, NII, NIII, NIV is activated at a time. Via the switches NI, NII, NIII, NIV, the receive signal output $R_x$ of demultiplexer 160 is connected with one of the outputs A1, A2 or A3 of the comparators 120, 121, 122 or with constant potential GND. Switch NIV may be omitted if output $R_x$ or the respective input of a downstream evaluating device is connected to constant potential GND via a resistor.

The logic circuit 140 is connected to the outputs A2 and A3 of second comparator 120 and third comparator 122 only. The logic circuit 140 comprises two gates 141, 142 with two outputs each and four gates 143 to 146 with one output each, for deriving the interference condition signal ER. The table already explained is also valid for the case with only comparator outputs A2 and A3 being connected to the logic circuit 140 by disregarding the column for A1. The outputs A2 and A3 are connected to the input contacts of gates 141 and 142, respectively. First outputs of gates 141 and 142 are connected to inputs of gates 143 and 144, respectively. Second outputs of gates 141 and 142 are combined and connected to input of gate 146. Outputs of gates 143 and 144 are combined and connected to input of gate 145. Combination of outputs of gates 145, 146 provides the interference condition signal ER. An interference condition signal ER=1 is provided only if the gate transistors of both gates 145, 146 are in a non-conducting state. Additional gates may be inserted into the signal paths of the interference condition signal as a buffer or converter stage 147.

Figure 5:
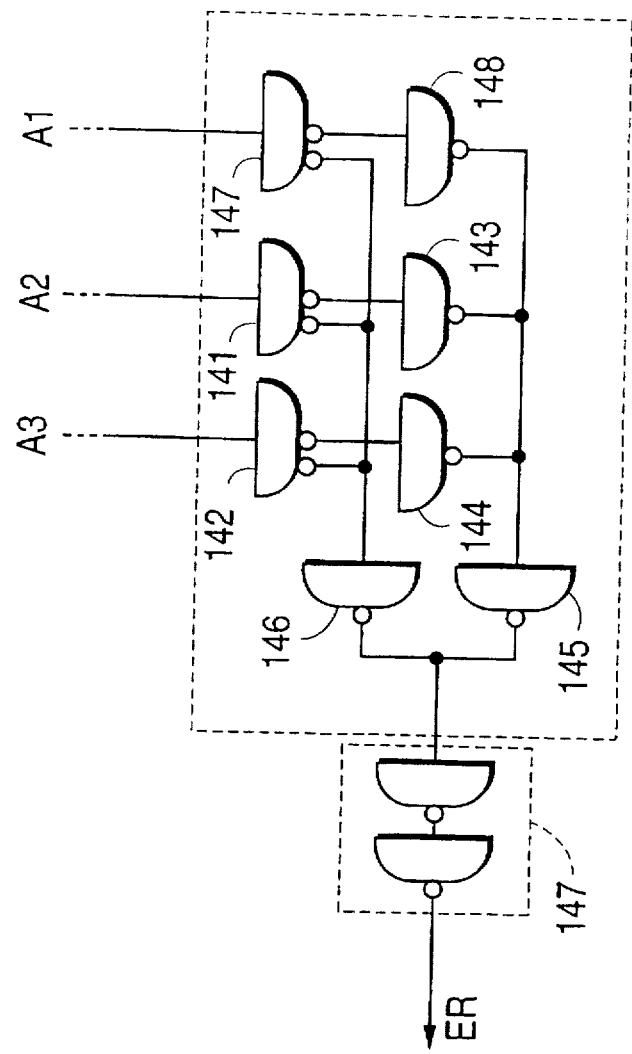
FIG. 5 is another embodiment of the logic circuit.

FIG. 5 shows another embodiment of a logic circuit for connecting the outputs A1, A2, A3 of three comparators 120, 121, 122 to its inputs. Compared to the logic circuit shown in FIG. 4 it comprises another pair of gates 148, 149 arranged in series and with their outputs connected to the outputs of gates 141, 142 and gates 113, 144 respectively.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An arrangement for monitoring a two-wire bus line for serial transmission of digital data, comprising:

a bus subscriber receiving circuit coupled to the two-wire line and including three comparators each having two inputs and an output for producing a logical output signal in dependence of signals at the two inputs, with a signal line voltage on each wire of the two-wire bus line being applied, respectively, to the two inputs of a first one of the comparators, and one of the two signal line voltages and an auxiliary voltage being applied, respectively, to the two inputs of a second one of the comparators, and the other of the two signal line voltages and an auxiliary voltage being applied, respectively, to the two inputs of a third one of the comparators; and a logic circuit coupled to the outputs of the three comparators for simultaneously receiving the logical output signals of at least the second and the third comparators and for signaling a fault-free condition of the bus system if all received logical output signals from the comparators are in agreement, and for signaling a fault if all received logical output signals from the comparators are not in agreement.

2. The arrangement according to claim 1, wherein the three comparators comprise receiving comparators for undisturbed operation and for single-wire operation at different operating conditions, and further comprising a demultiplexer having inputs connected, respectively, to the outputs of the three comparators for selectively forwarding one of the comparator output signals to a receiving evaluation device.

3. The arrangement according to claim 1, wherein the logic circuit is comprised of $I^2L$ technology.

4. The arrangement according to claim 1, further comprising means for producing an offset voltage and coupling the offset voltage to one of the inputs of the first comparator.

5. The arrangement according to claim 1, wherein the output of the first comparator is fed to the logic circuit.

6. The arrangement according to claim 1, further comprising means for deriving bus voltages and auxiliary voltages from a non-stabilized supply voltage and for varying the bus voltages and auxiliary voltages with the non-stabilized supply voltage.

* * * * *